(12) United States Patent
Denton

(10) Patent No.: US 10,020,085 B2
(45) Date of Patent: Jul. 10, 2018

(54) ISOTOPE-SPECIFIC SEPARATION AND VITRIFICATION

(71) Applicant: Kurion, Inc., Irvine, CA (US)

(72) Inventor: Mark S. Denton, Knoxville, TN (US)

(73) Assignee: KURION, INC., Irvine, CA (US)

( * ) Notice: Subject to any disclaimer, the term of this patent is extended or adjusted under 35 U.S.C. 154(b) by 265 days.

(21) Appl. No.: 15/134,818

(22) Filed: Apr. 21, 2016

(65) Prior Publication Data

US 2016/0293283 A1 Oct. 6, 2016

Related U.S. Application Data

(62) Division of application No. 13/043,843, filed on Mar. 9, 2011, now Pat. No. 9,437,336.

(60) Provisional application No. 61/312,029, filed on Mar. 9, 2010.

(51) Int. Cl.
*G21F 9/00* (2006.01)
*G21F 9/16* (2006.01)
*G21F 9/12* (2006.01)
*G21F 9/30* (2006.01)
*G21F 9/02* (2006.01)

(52) U.S. Cl.
CPC ............... *G21F 9/125* (2013.01); *G21F 9/02* (2013.01); *G21F 9/12* (2013.01); *G21F 9/16* (2013.01); *G21F 9/162* (2013.01); *G21F 9/305* (2013.01)

(58) Field of Classification Search
CPC ............ G21F 9/16; G21F 9/162; G21F 9/305
USPC ......... 204/571; 205/742, 746, 751; 210/695; 502/401, 439; 588/10, 11
See application file for complete search history.

(56) References Cited

U.S. PATENT DOCUMENTS

| | | |
|---|---|---|
| 3,340,200 A | 9/1967 | Noble |
| 3,407,571 A | 10/1968 | Sherwood |
| 4,280,984 A | 7/1981 | Miyake et al. |
| 4,389,253 A | 6/1983 | Nishimura et al. |
| 4,469,628 A | 9/1984 | Simmons |
| 4,494,965 A | 1/1985 | Ali-Khan et al. |
| 4,585,583 A | 4/1986 | Robertson et al. |
| 4,661,258 A | 4/1987 | Phillips |
| 5,080,693 A | 1/1992 | Bourne et al. |
| 5,089,217 A | 2/1992 | Corpora et al. |

(Continued)

FOREIGN PATENT DOCUMENTS

| | | |
|---|---|---|
| CN | 101501786 A | 8/2009 |
| EP | 111839 | 6/1987 |

(Continued)

OTHER PUBLICATIONS

King, L. & Opelka, J., Three Mile Iland Cleanup: Experiences, Waste Disposal, and Environmental Impact, vol. 78, 1982, American Inst of Chemical Engineers, NY.

(Continued)

*Primary Examiner* — Dirk Bass
(74) *Attorney, Agent, or Firm* — Schwabe Williamson & Wyatt

(57) ABSTRACT

Apparatuses, processes and methods for the separation, isolation, or removal of radioactive isotopes from liquid radioactive waste, these processes and methods employing a plurality of microspheres. In some embodiments, the processes and methods further include the vitrification of the separated isotopes, generally with the plurality of microspheres. Vitrification is often a step in a larger scheme of preparing the radioactive isotopes for long-term storage or other disposition.

12 Claims, 9 Drawing Sheets

(56) References Cited

U.S. PATENT DOCUMENTS

| | | | |
|---|---|---|---|
| 5,250,187 A | 10/1993 | Franks | |
| 5,645,518 A | 7/1997 | Wagh et al. | |
| 5,885,925 A | 3/1999 | DeFilippi et al. | |
| 5,960,368 A | 9/1999 | Pierce et al. | |
| 6,159,437 A | 12/2000 | Itoi et al. | |
| 6,348,153 B1 | 2/2002 | Patterson et al. | |
| 6,387,271 B1 | 5/2002 | Geibel | |
| 6,459,010 B1 | 10/2002 | Carpena | |
| 6,485,404 B1 | 11/2002 | Powell et al. | |
| 7,115,542 B2 | 10/2006 | Tranter et al. | |
| 2002/0141916 A1 | 10/2002 | Graham | |
| 2004/0081604 A1 | 4/2004 | Lemaire et al. | |
| 2004/0138514 A1 | 7/2004 | Tranter et al. | |
| 2007/0051683 A1 | 3/2007 | Izumi | |
| 2007/0297858 A1 | 12/2007 | Imbrie | |
| 2010/0020915 A1 | 1/2010 | Beets et al. | |
| 2011/0224472 A1 | 9/2011 | Denton | |
| 2011/0224473 A1 | 9/2011 | Denton | |
| 2011/0224474 A1 | 9/2011 | Denton | |

FOREIGN PATENT DOCUMENTS

| | | |
|---|---|---|
| EP | 243557 A1 | 11/1987 |
| EP | 1393806 B1 | 2/2007 |
| GB | 1464316 A | 2/1977 |
| JP | 50-127100 A | 9/1975 |
| JP | 56-137299 A | 10/1981 |
| JP | 57-042508 A | 3/1982 |
| JP | 62-011510 A | 1/1987 |
| JP | 64-091096 A | 4/1989 |
| JP | 05-066295 A | 3/1993 |
| JP | 08-105998 A | 4/1996 |
| JP | 11-193293 | 7/1999 |
| JP | H11193293 A | 7/1999 |
| JP | 2000-506827 A | 6/2000 |
| JP | 2002-267795 A | 9/2002 |
| JP | 2005-500158 A | 1/2005 |
| JP | 2005-091116 A | 4/2005 |
| WO | 1999/62828 A1 | 12/1999 |
| WO | 2001/95342 A1 | 12/2001 |
| WO | 2009/045230 | 4/2009 |
| WO | 2009/051878 | 4/2009 |
| WO | 2011/152909 | 12/2011 |

OTHER PUBLICATIONS

IAEA, "Management of Waste Containing Tritium and carbon-14" http://www-pub.iaea.org/MTCD/publications/PDF/TRS421_web.pdf, Jun. 1996 on Jul. 2011.

Drake, Robert H., "Recovery of Tritium from Tritiated Water Cost-Effectiveness Analysis" Jun. 1996, http://www.fas.org/spg/othergov/doe/lan/llb-www/la-pubs/000326809.pdf.

Hujie et al., "Zeolite Adsorption to Simulated Radioactive Nuclein", Journal of Southwest University of Science and Technology, vol. 21., No. 3, pp. 1-4 and 18, Sep. 2006.

Huanyan et al., "Adsorption of Aqueous Cadmium on Carbonate Hydroxyapatite", J. Mineral Petrol, vol. 24, No. 1, pp. 108-112, Mar. 2004.

Listing of Related Cases; Apr. 20, 2016.

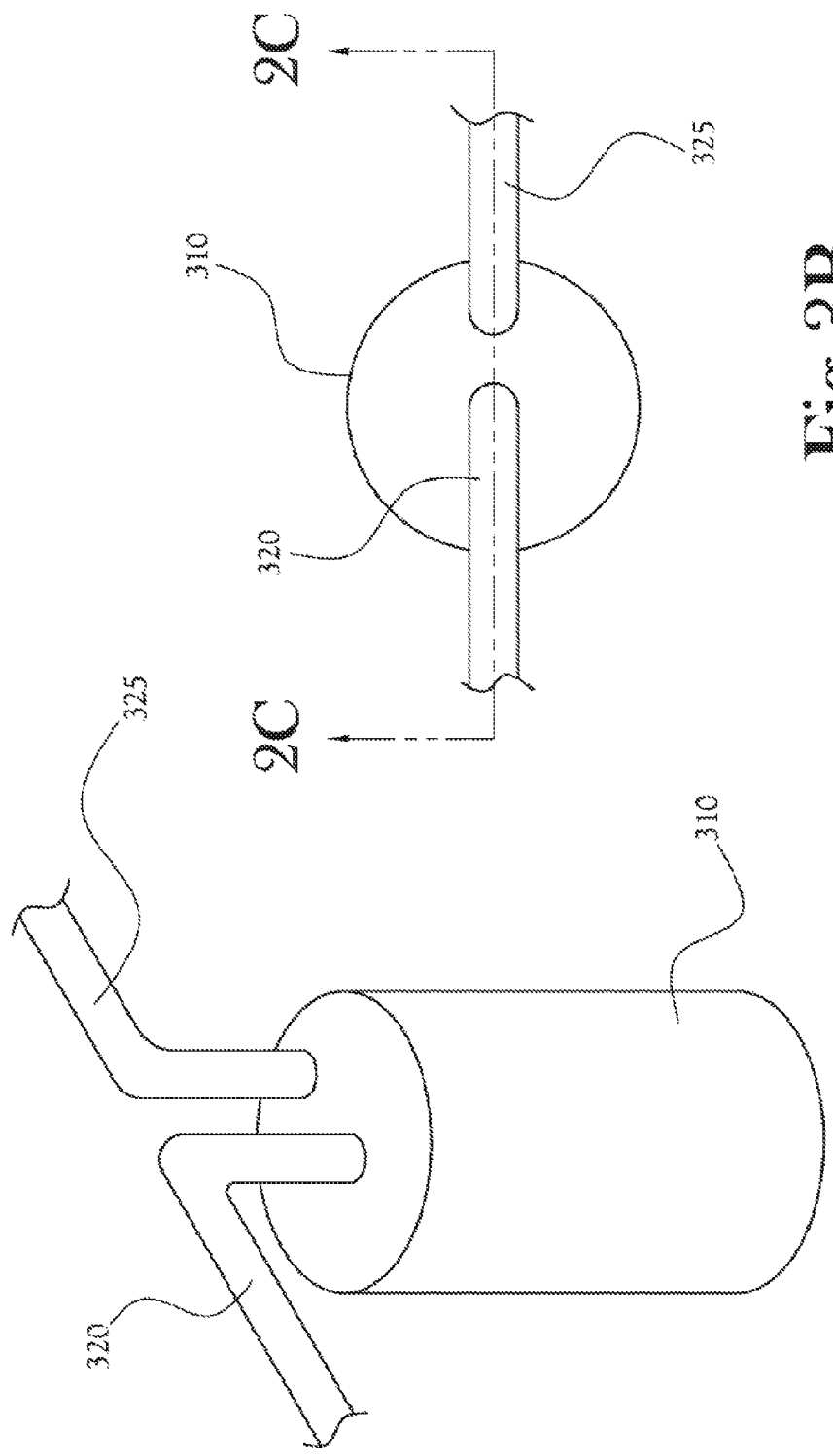

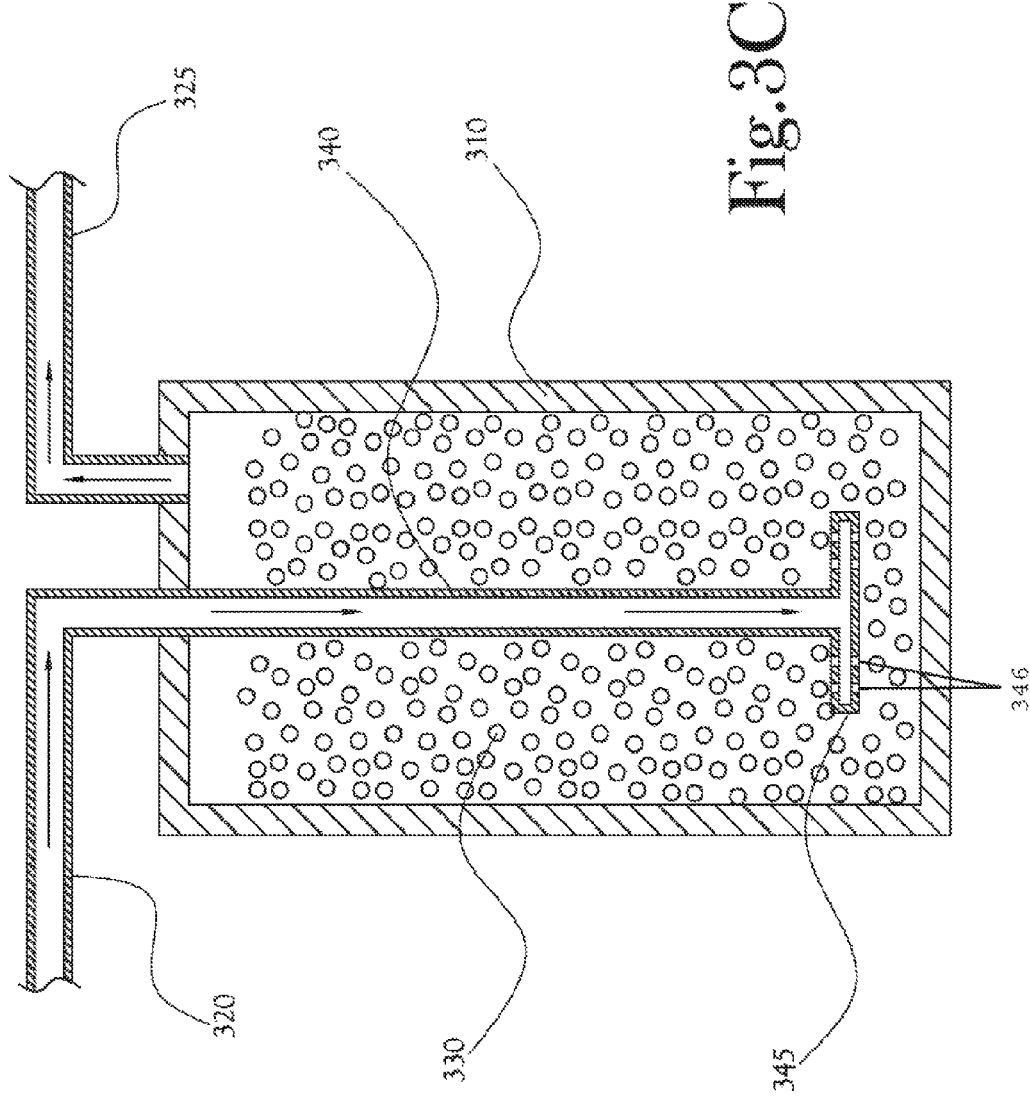

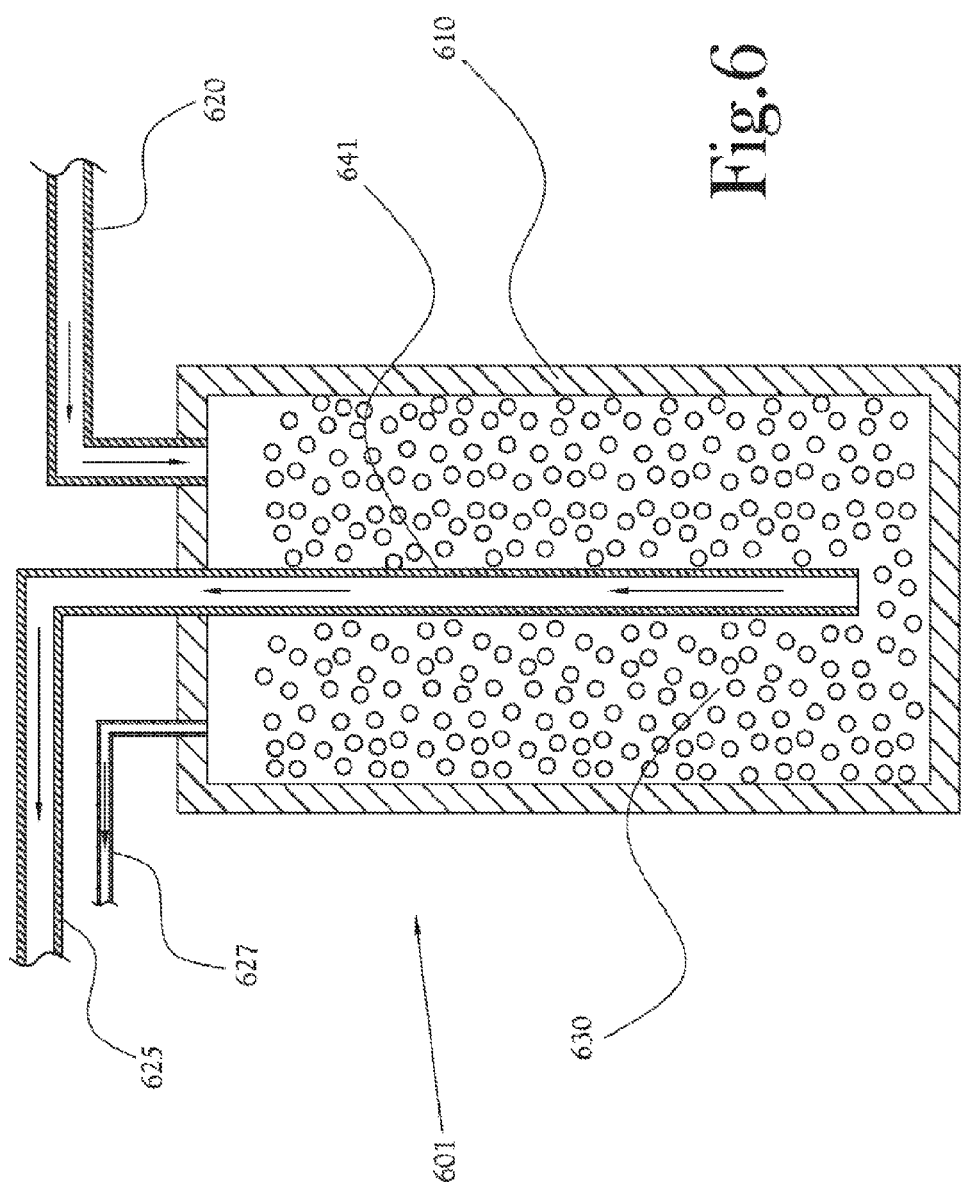

ISOTOPE-SPECIFIC SEPARATION AND VITRIFICATION

CROSS-REFERENCE TO RELATED APPLICATIONS

This application is a divisional application of U.S. patent application Ser. No. 13/043,843, filed Mar. 9, 2011, which claims benefit of U.S. Provisional Application Ser. No. 61/312,029, filed Mar. 9, 2010, the contents of which are herein incorporated by reference in their entirety.

STATEMENT REGARDING FEDERALLY-SPONSORED RESEARCH OR DEVELOPMENT

Not Applicable

BACKGROUND OF THE INVENTION

1. Field of Invention

The present invention relates generally to the treatment of radioactive waste and in particular to the separation of specific radioactive isotopes from radioactive waste materials.

2. Description of the Related Art

The capability to isolate and manage specific radioactive isotopes is necessary for clean, safe, and secure radioactive waste management, which in turn is essential for the safe and cost-effective use of nuclear power. In nuclear power plants, radioactive isotopes leak into the primary and secondary water loops of light water nuclear reactors; this leakage is an unavoidable result of the decay of nuclear fuel as well as the nuclear activation (through exposure to radiation from the reactor core) of reactor components.

The concentration of particular radioactive isotopes in waste materials generally determines the waste classification of the waste material (for example, Class A, Class B, Class C). The waste classification of waste material in turn delineates the storage and disposal requirements for that waste material. As a rule, waste material that receives a higher classification (such as Class B or Class C) fares stricter storage and disposal requirements, is more costly to manage, and can be legally stored in fewer locations. Therefore, it is desirable to limit the volume and amount of waste material that receives a higher classification by separating or removing from that waste material those specific radioactive isotopes that drive waste classification. In this regard, particularly desirable are systems, methods and processes for the separation of Cs-137, Sr-90, Ni-63, Tc-99, Am-241, Co-58, Co-60, and several isotopes of Uranium. It would also be advantageous for the isotope-separation technology to also facilitate and work with technology for the processing of those specific radioactive isotopes for long-term storage or disposal, as for example through solidification or vitrification.

BRIEF SUMMARY OF THE INVENTION

Ion-specific media selectively remove isotopes that determine waste classification. One aim of the present invention is to direct the isotopes that drive waste-classification, especially Cesium-137, Nickel-63, and Strontium-90, into very small packages for on-site storage, enhancing the volume of lower-classification waste for disposal off-site.

The present invention, in some of its embodiments, includes processes, methods, and apparatuses for the separation, isolation, or removal (collectively "separation") of specific radioactive isotopes from radioactive waste, these processes and methods employing isotope-specific media (ISM). In some embodiments, processes and methods further include the vitrification of the separated isotopes, generally with the isotope-specific media; this isotope-specific vitrification is often a step in a larger scheme of preparing the radioactive isotopes for long-term storage or other disposition. In some embodiments, the present invention includes the isotope-specific regeneration of specific radioactive isotopes onto ISM for vitrification.

In several embodiments, the ISM comprise porous microspheres or porous mineral substances like Hersehelite; all of these media materials present a large reactive surface area per weight of media. These porous or highly porous media separate and retain radioactive isotopes from other waste material. The radioactive isotopes, when they come into contact with the media particles or constituents, are retained on the reactive surface areas of the isotope-specific media or within the interstitial spaces of the porous structures. In many embodiments, the media are embedded, impregnated, or coated with the specific radioactive isotope that the particular isotope-specific media are adapted to separate. In general, each type of ISM used in the present invention is selected to separate a specific isotope or a specific family or group of isotopes.

In many embodiments of the present invention, the ISM-based separation of specific radioactive isotopes from liquid wastes includes running liquid wastes through a modified ion exchange column (hereinafter an "ISM column"), wherein the liquid is passed through a column of ISM and the ISM attract and retain specific radioactive isotopes within the liquid; the radioactive isotopes then remain with the ISM in the column while the liquid exits the column. In some embodiments, the ISM with separated radioactive isotopes are removed from the column container and conveyed to a crucible or melter for vitrification. In some embodiments, the ISM with separated radioactive isotopes remain in the column container, and the vitrification of the ISM with separated radioactive isotopes takes place within the column container. In these embodiments where vitrification takes place within the column container, the column container generally comprises a canister adapted to act as a vitrification crucible and as the long-term storage vessel for the final waste product. In some cases the canister includes an outer layer of stainless steel or comparable material, a middle layer of insulation, and an inner layer (or liner layer) of graphite or similar material to act as a crucible or module for the pyrolysis, melting, and vitrification of the ISM with the radioactive isotopes; in some embodiments, a graphite inner layer acts as a susceptor for the inductive heating of the ISM with the radioactive isotopes. In some of these embodiments, the ISM are mixed with a material that augments or helps to initiate the vitrification process. The pyrolysis, melting, and vitrification of the ISM with the radioactive isotopes generally is achieved by inductive heating or microwave heating, although other methods for pyrolysis, melting, and vitrification are also compatible with the present invention.

BRIEF DESCRIPTION OF THE DRAWINGS

The above-mentioned and additional features of the invention will become more clearly understood from the following detailed description of the invention read together with the drawings in which:

FIG. 3A is a perspective view of one embodiment of an ISM-column according to the present invention;

FIG. 3B is a top-down view of the embodiment shown in FIG. 3A, showing the line along which is taken the section view shown in FIG. 3C;

FIG. 3C is a section view of the embodiment shown in FIGS. 3A and 3B;

FIG. 6 is a section view of an alternate embodiment of an ISM-column according to the present invention.

DETAILED DESCRIPTION OF THE INVENTION

The present invention, in some of its embodiments, includes processes and methods for the separation, isolation, or removal (collectively "separation") of specific radioactive isotopes from radioactive waste, these processes and methods employing isotope-specific media (ISM). In some embodiments, the processes and methods further include the vitrification of the separated isotopes, generally with the ISM; this isotope-specific vitrification (ISV) is often a step in a larger scheme of preparing the radioactive isotopes for long-term storage or other disposition. In many cases, a combined process that includes both isotope separation using ISM and isotope-specific vitrification—i.e., a combined ISM/ISV process) is part of a larger system for treating radioactive waste.

In several embodiments, the ISM comprise porous microspheres that present a large reactive surface area per weight of media. For example, for ISM, some embodiments of the present invention use glass-based, microspheres with average diameters on the order of 10 to 100 microns, combined external and internal surface areas of 100 to 200 square meters per gram, and total porosity of approximately 35% to 40%. Other embodiments use ISM based on or containing Herschelite, a porous mineral substance with a combined external and internal surface area of approximately 500 square meters per gram. These porous or highly porous media separate and retain radioactive isotopes from other waste material. The radioactive isotopes, when they come into contact with the media particles or constituents, are retained on the reactive surface areas of the ISM or within the interstitial spaces of the porous structures. In many embodiments, the media are embedded, impregnated, or coated with the specific radioactive isotope that the particular ISM are adapted to separate. Thus, for example, one type of ISM used to separate cesium isotopes from liquid includes glass-based microspheres that contain cesium; these cesium-containing glass-based microspheres are especially effective at attracting and retaining cesium isotopes. In general, each type of ISM used in the present invention is selected to separate a specific isotope or a specific family or group of isotopes.

Figure 1:
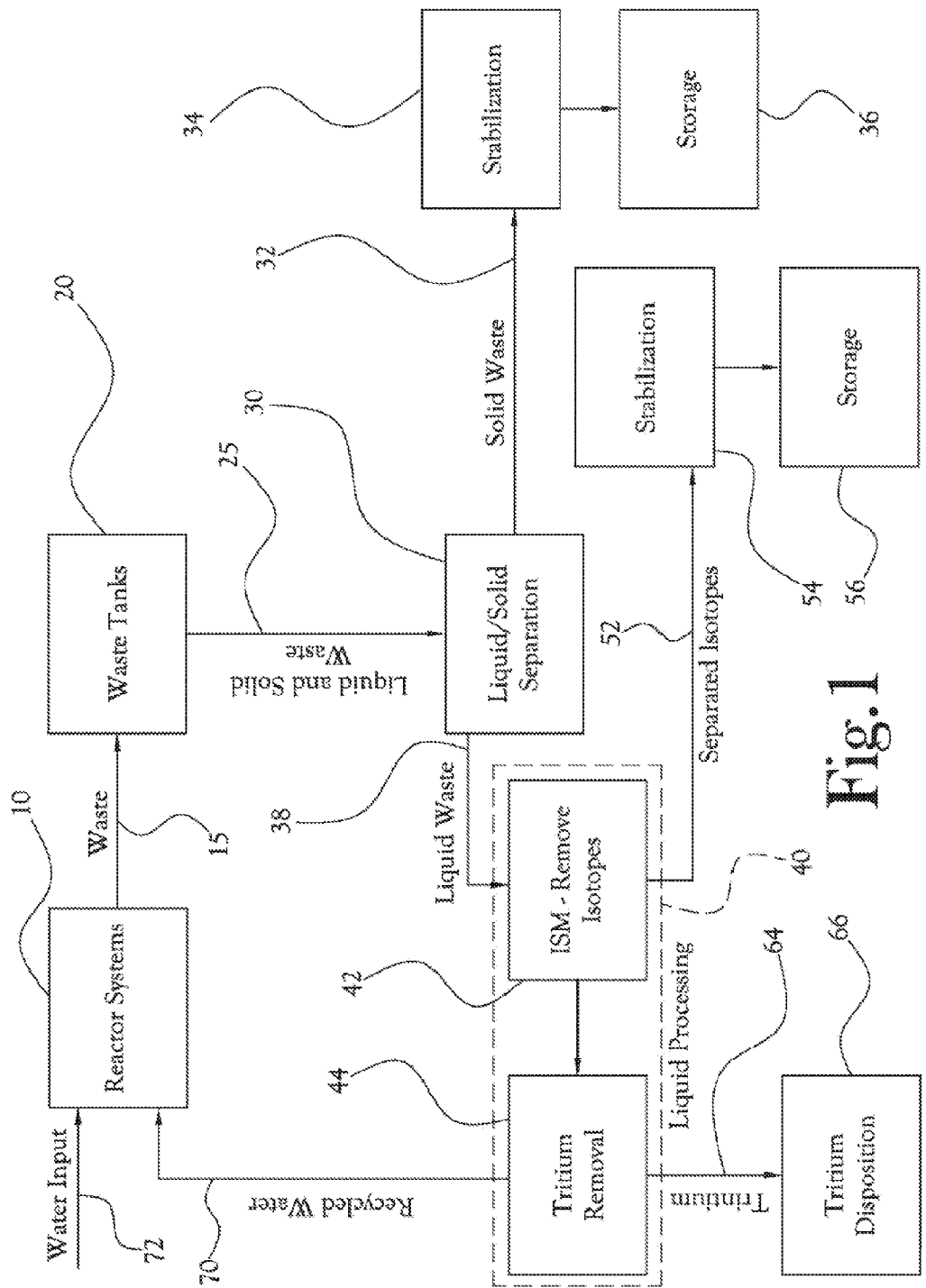
FIG. 1 is a block diagram illustrating one example of a system for processing radioactive waste materials that includes an ISM-based system for separating specific radioactive isotopes from liquid radioactive waste material.

FIG. 1 illustrates one embodiment of a larger system within which an ISM/ISV process is a component. As shown in the illustration, radioactive waste material from a nuclear reactor 10 is conveyed 15 first to waste tanks 20, where the waste material is kept submerged in wafer (which thereby itself comes to contain a concentration of radioactive isotopes). The waste material, which at this stage includes both liquid and solid wastes, is conveyed 25 from the waste tanks 20 to a liquid/solid separation system 30 where liquid wastes (including the water from the waste tanks 20) are separated from the solid wastes. From the liquid/solid separation system 30, the solid wastes proceed 32 to stabilization 34 and storage 36. It is possible that, in some instances, not all of the moisture or liquid mixed with the solid wastes will be separated from the solid wastes by the liquid/solid separation system 30, in which case the stabilization and storage of those wastes will proceed differently.

From the liquid/solid separation system 30, liquid wastes that are substantially free of solid waste material proceed 38 to a liquid processing system 40. In some embodiments, such as the one illustrated in FIG. 1, the liquid processing system 40 comprises an ISM-based system 42 for the separation of specific isotopes and a tritium removal system 44 for the removal of tritium from the liquid wastes. Separated isotopes 52 removed by ISM from the liquid wastes are stabilized 54 and moved to storage 56 or other disposition (with the final disposition or storage conditions often dependent upon the specific isotope involved). Tritium removed from the liquid wastes proceeds 64 to its own disposition 66; generally, recovered tritium is a valuable product. The liquid (mostly water), now substantially free of specified radioactive isotopes and tritium, usually is recycled 70 into the reactor 10, where it is combined with other water 72 fed into the reactor 10. In some embodiments, liquid emerging from the liquid processing system 40 proceeds, not to the reactor 10 to be recycled, but to storage for low-classification waste.

In many embodiments of the present invention, the ISM-based separation of specific radioactive isotopes from liquid wastes includes running liquid wastes through a modified ion exchange column (hereinafter an "ISM column"), wherein the liquid is passed through a column of ISM and the ISM attract and retain specific radioactive isotopes within the liquid; the radioactive isotopes then remain with the ISM in the column while the liquid exits the column.

A number of ISM materials are contemplated by the present invention. Many of the media used for ISM-based isotope separation include porous glass or porous glass-based materials. Many of the media used for ISM-based isotope separation include some form of Herschelite or one or more Hersehelite derivatives. Many of the media used for ISM-based isotope separation include some mineral material or mineral-based material. The nature of the ISM used in the column generally is dependent upon the isotope to be removed. For example, in some embodiments, media for the separation of cesium (i.e., cesium-specific media) include modified Herschelite ($(Na,Ca,K)AlSi_2O_6 \cdot 3H_2O$). In some embodiments, cesium-specific media include Herschelite modified with (e.g., mixed with, coated with, or impregnated with) potassium cobalt hexacyanoferrate ("KCCF"). In some embodiments, media for the separation of strontium isotopes (i.e., strontium-specific media) include glass-based microspheres modified to hydroxyapatite ("HA microspheres"). In some embodiments, media for the separation of technetium isotopes (i.e., technetium-specific media) include Herschelite modified with ceryltrimethylammonium ("CTMA"). In some embodiments, technetium-specific media include a surfactant-modified zeolite (SMZ), such as a zeolite in which some of the surface cations of the zeolite are replaced by a high-molecular-weight surfactant such as CTMA. In some embodiments, media for the separation of nickel isotopes (i.e., nickel-specific media) include Herschelite or HA microspheres. In some embodiment, media for the separation of cobalt isotopes (i.e., cobalt-specific media) include Herschelite or HA microspheres. In some embodiments, media for the separation of lead isotopes (i.e., lead-specific media) include Herschelite or HA microspheres. In some embodiments, media for the separation of iodine isotopes (i.e., iodine-specific media) include Herschelite impregnated with silver. In some embodiments, media for the separation of arsenic isotopes (i.e., arsenic-specific media) include Herschelite impregnated with iron. In some embodiments, media for the separation of selenium isotopes (i.e., selenium-specific media) include HA microspheres modified with CTMA or Herschelite impregnated with iron. In some embodiments, media for the separation of antimony isotopes (i.e., antimony-specific media) include HA microspheres modified with CTMA or Herschelite impregnated with iron. In some embodiments, media for the separation of americium isotopes (i.e., americium-specific media) include HA microspheres. Other ISM for the separation from liquid wastes include media for the separation of nickel, cobalt, lead, iron, antimony, iodine, selenium, americium, mercury, fluorine, plutonium, and uranium. ISM encompassed by the present invention include media for targeting isotopes including, but not limited to, Ni-63, Co-58, Co-60, Fe-55, Sb-125, I-129, Se-79, Am-241, and Pu-239. Other media used in some embodiments of the present invention include a modified form of hydroxyapatite in which other cations substitute for at least some of the calcium ions, the other cations often being ions such as strontium, tin, or silver. Other media used in some embodiments of the present invention include SMZ in which the zeolite has been modified with one or more anionic or cationic surfactants. Other media used in some embodiments of the present invention include glass-based microspheres impregnated with iron or silver. Other media used in some embodiments of the present invention include silver-impregnated zeolites. Other media used in some embodiments of the present invention include silver-modified zirconium oxide, silver-modified manganese oxide, and iron-modified aluminum silicate. In general, a number of media, including Herschelite, silver-impregnated Herschelite, iron-impregnated Herschelite, Herschelite modified with KCCF, Herschelite modified with CTMA, HA microspheres, HA microspheres modified with CTMA, and HA microspheres modified with KCCF, are used to separate one or more specific radioactive isotopes from liquid wastes. The media given here are examples and do not constitute an exhaustive list of materials used in ISM-based isotope-separation systems and processes. Some columns include a combination of two or more media.

Figure 2A:
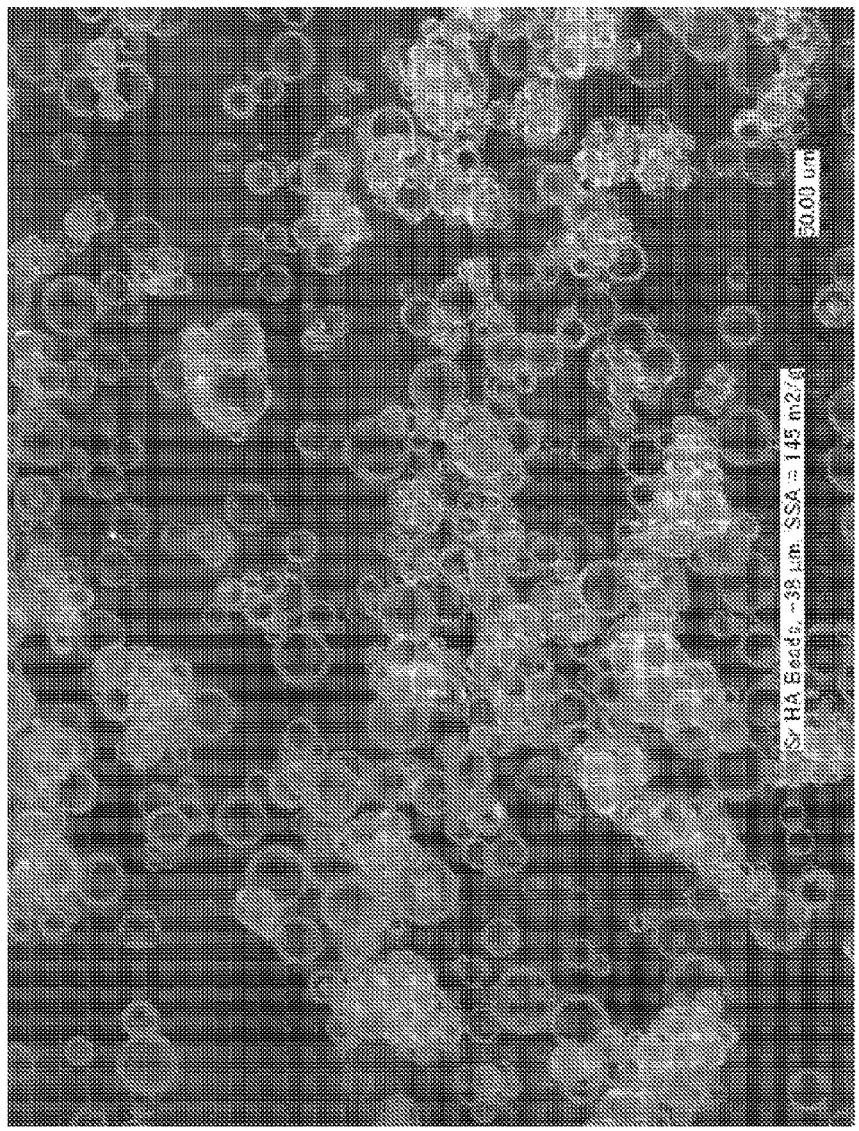
FIG. 2A is a photograph of an electron microscope image of glass-based microspheres for use in an ISM-based system for separating specific radioactive isotopes from liquid radioactive waste material.
Figure 2B:
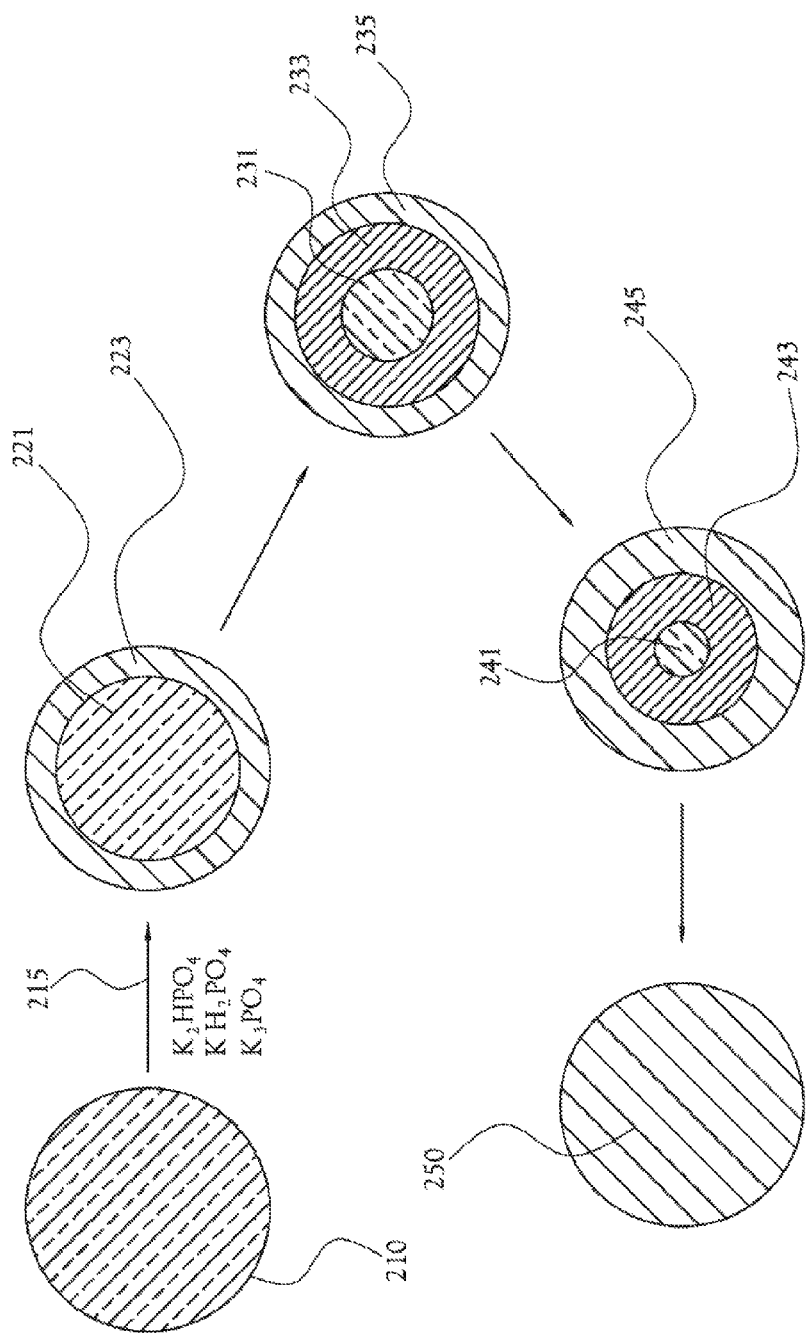
FIG. 2B is a diagram illustrating one process for forming glass-based microspheres which are then used or modified for use in an ISM-based system for separating specific radioactive isotopes from liquid radioactive waste material.
Figure 2C:
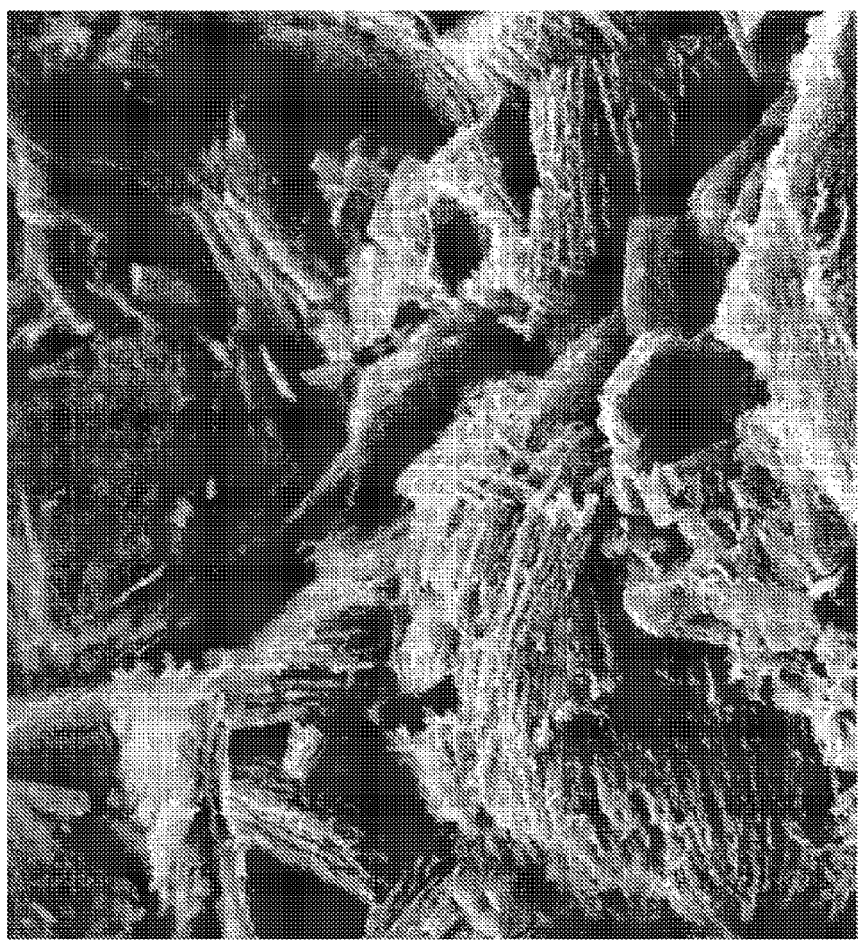
FIG. 2C is a photograph of an electron microscope image of a Herschelite material for use in an ISM-based system for separating specific radioactive isotopes from liquid radioactive waste material, the image showing the Herschelite with approximately 1050× magnification.

In many embodiments of the present invention, the ISM column comprises ISM in the form of porous microspheres, especially glass-based microspheres. FIG. 2A is a photograph of an electron microscope image of HA-modified glass-based microspheres used, for example, for separating strontium. FIG. 2B illustrates one process through which one type of porous glass-based microsphere is prepared. Some embodiments of the process begin with glass beads 210 fabricated from a mixture comprising sodium, calcium, and boron. The glass beads 210 are mixed 215 with a potassium phosphate solution (or similar phosphate solution) with basic pH; in many embodiments, the solution also includes potassium hydroxide or another hydroxide source. As sodium, calcium, and boron ions are released from the glass, beginning at the surface of the glass beads 210, phosphate and hydroxide ions react with calcium that remains on the beads to form a layer of amorphous calcium phosphate 223 surrounding the unreacted glass core 221 of the bead. As phosphate and hydroxide ions continue to act on the glass core 221, and the unreacted core shrinks 231 and the layer of amorphous calcium phosphate 233 grows. At the same time, the amorphous calcium phosphate furthest from the site of reaction on the glass core, in conjunction with hydroxide ions drawn from the solution, begins to stabilize into a hydroxyapatite (HA) layer 235. The HA layer continues to grow 245 as the glass core continues to shrink 241 and react to form amorphous calcium phosphate 243. The end result of this process is a porous microsphere 250 substantially composed of HA. In many embodiments of the present invention, the ISM column comprises a Herschelite or modified Herschelite material. FIG. 2C is a photograph of an electron microscope image of a Herschelite material.

FIGS. 3A, 3B, and 3C illustrate one embodiment of an ISM column according to the present invention. FIG. 3A presents a perspective view of the column container 310 (in the illustrated embodiment, a cylinder, although other shapes are possible), which is connected to an inlet line 320 and an outlet line 325. FIG. 3B presents a top-down view of the ISM column, showing the line along which the section view shown in FIG. 3C is taken. As shown in the section view in FIG. 3C, the column tube is largely filled with bead-form ISM 330; in many embodiments, the ISM 330 comprise glass-based microspheres or similar materials, as described above. A dip tube 340 extends from the top of the column container 310 into the interior of the column, nearly to the bottom of the column container 310. A distribution ring 345 is connected to the lower end of the dip tube 340. When liquid waste material containing radioactive isotopes enters the column though the inlet line 320 (travelling in the direction indicated by the arrows in FIG. 3C), the liquid travels down the dip tube 340 and into the distribution ring 345. The distribution ring 345 disperses liquid throughout the width of the column, and the liquid enters the space filled with ISM 330. As liquid is pumped or otherwise forced though the inlet line 320 and dip tube 340 into the column, liquid is forced to rise through the ISM space, passing by and through the porous ISM 330. As the liquid passes near and through the ISM 330, file media attract and retain specific radioactive isotopes carried by the liquid, separating those isotopes from the liquid. The liquid, having been forced through the ISM 330, exits the column through the outlet line 325 at the top of the column container 310.

As liquid continues to pass through the ISM 330 within the column, the ISM 330 continues to separate and retain radioactive isotopes. Eventually, as separated radioactive isotopes come to fill almost all of the available retention sites on the media, the ISM 330 cease to effectively filter or separate radioactive isotopes from additional incoming liquid waste material. At this point, the addition of liquid waste material to the column ceases, and the ISM 330, now carrying separated radioactive isotopes, undergo additional processing preparatory to final storage or disposition. In some embodiments, the ISM beads with separated radioactive isotopes are removed from the column container 310 and conveyed to a storage container for later processing. In some embodiments, the ISM beads with separated radioactive isotopes are removed from the column container 310 and conveyed to a crucible or melter for vitrification. In some embodiments, the ISM 330 with separated radioactive isotopes remain in the column container 310, and the vitrification of the ISM 330 with separated radioactive isotopes takes place within the column container 310.

In these embodiments where vitrification takes place within the column container 310, the column container 310 generally comprises a canister adapted to act as a vitrification, crucible and as the long-term storage vessel for the final waste product. In some cases the canister includes an outer layer of stainless steel or comparable material, a middle layer of insulation, and an inner layer (or liner layer) of graphite or similar material to act as a crucible tor the pyrolysis, melting, and vitrification of the ISM 330 with the radioactive isotopes. In some embodiments, a graphite inner layer acts as a susceptor for the inductive heating of the ISM 330. In some of these embodiments, the ISM 330 are mixed with a material that augments or helps to initiate the vitrification process. The pyrolysis, melting, and vitrification of the ISM 330 with the radioactive isotopes generally is achieved by inductive heating or microwave heating, although other methods for pyrolysis, melting, and vitrification am also compatible with the present invention. In some embodiments, the vitrification of the ISM and radioactive isotopes is carried out by processes similar to those described in U.S. patent application Ser. No. 12/985,362, by the same inventor as the present invention. In many embodiments, the dip tube 340 and distribution ring 345 are fabricated from a ceramic or porous graphite material, or a similar material, that will withstand the pyrolysis, melting, and vitrification along with the ISM 330; in these embodiments, the dip tube 340 and the distribution ring 345 become encased in the final vitrified waste product. In some embodiments, the dip tube 340 and distribution ring 345 are fabricated from a material that will undergo vitrification along with the ISM 330; thus, the dip lube 340 and distribution ring 345 become part of the same vitrified final waste product. In other embodiments, the dip tube 340 and distribution ring 345 are removed from the column container 310 before the vitrification process begins.

Figure 4:
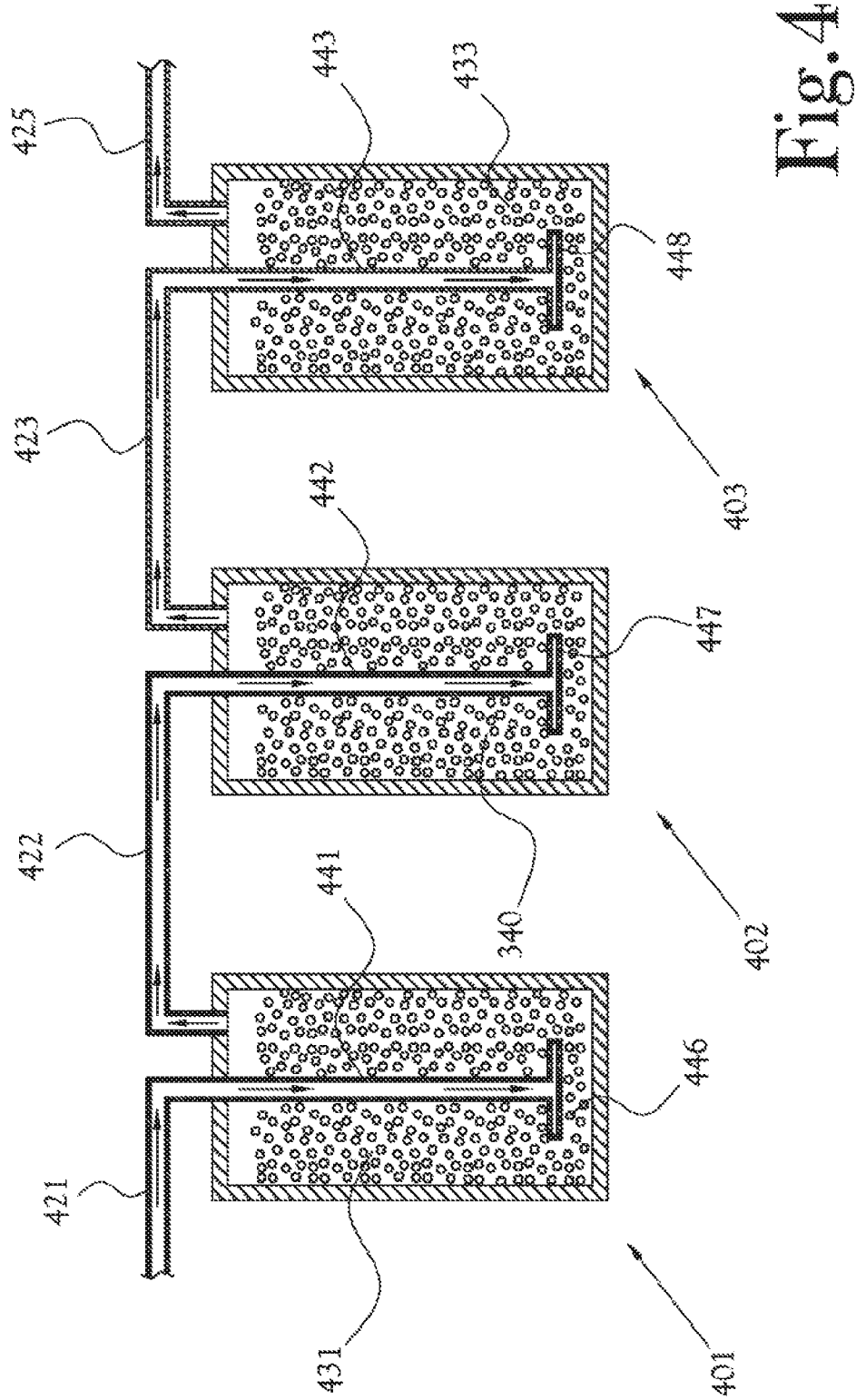
FIG. 4 is a view of one embodiment of the present invention, showing multiple ISM-columns being used in series.

FIG. 4 illustrates one embodiment of the present invention, in which liquid waste material is passed through multiple ISM columns 401, 402, 403 in order to remove separate different radioactive isotopes into distinct columns. As in FIG. 3C, each ISM column comprises a column container, a dip tube, distribution ring, inlet line, outlet line, and bead-form ISM. In the illustrated embodiment, liquid waste enters the first column 401 through an inlet line 421 and a first dip tube 441. Liquid passes from the first dip tube 441 and first distribution ring 446 into the first ISM 431, which, for purposes of illustration, in this example comprise Herschelite modified with KCCF, selected to capture cesium isotopes in the liquid. From the first column 401 liquid travels through a second line 422 into the second column 401; the liquid passes through a second dip tube 442 and distribution ring 447 into a second ISM 432. For purposes of illustration, the media in this second column 402 comprise I-IA microspheres, selected to separate strontium isotopes and other actinides from the liquid. Liquid emerges from the second column 402 through a third line 423 and passes into a third column 403; the liquid passes through a third dip tube 443 and distribution ring 448 into a third ISM 433. For purposes of illustration, the media in this third column 403 comprise a mixture of Herschelite modified with CTMA and surfactant-modified zeolite, selected to separate technetium isotopes from the liquid. The liquid, now substantially free of cesium, strontium, and technetium isotopes, emerges from the third column 403 through an outlet line 425. In this way, each column 401, 402, 403 separates and captures a different set of radioactive isotopes, and each column proceeds to disposal subject to the requirements for its own specific set of radioactive isotopes. In some embodiments, some columns, which separate lower-classification isotopes from the liquid, will receive a lower waste classification level than other columns that separate higher-classification isotopes from the liquid, it will be recognized that the order of ISM columns (cesium strontium, technetium) in the illustrated embodiment is only one example, and that different sequential orderings of columns are possible. It will also be recognized that different types of columns, adapted to separate different specified isotopes, are possible and encompassed by the present invention. It will further be recognized that different media are possible besides those given as examples for the purposes of FIG. 4.

Figure 5:
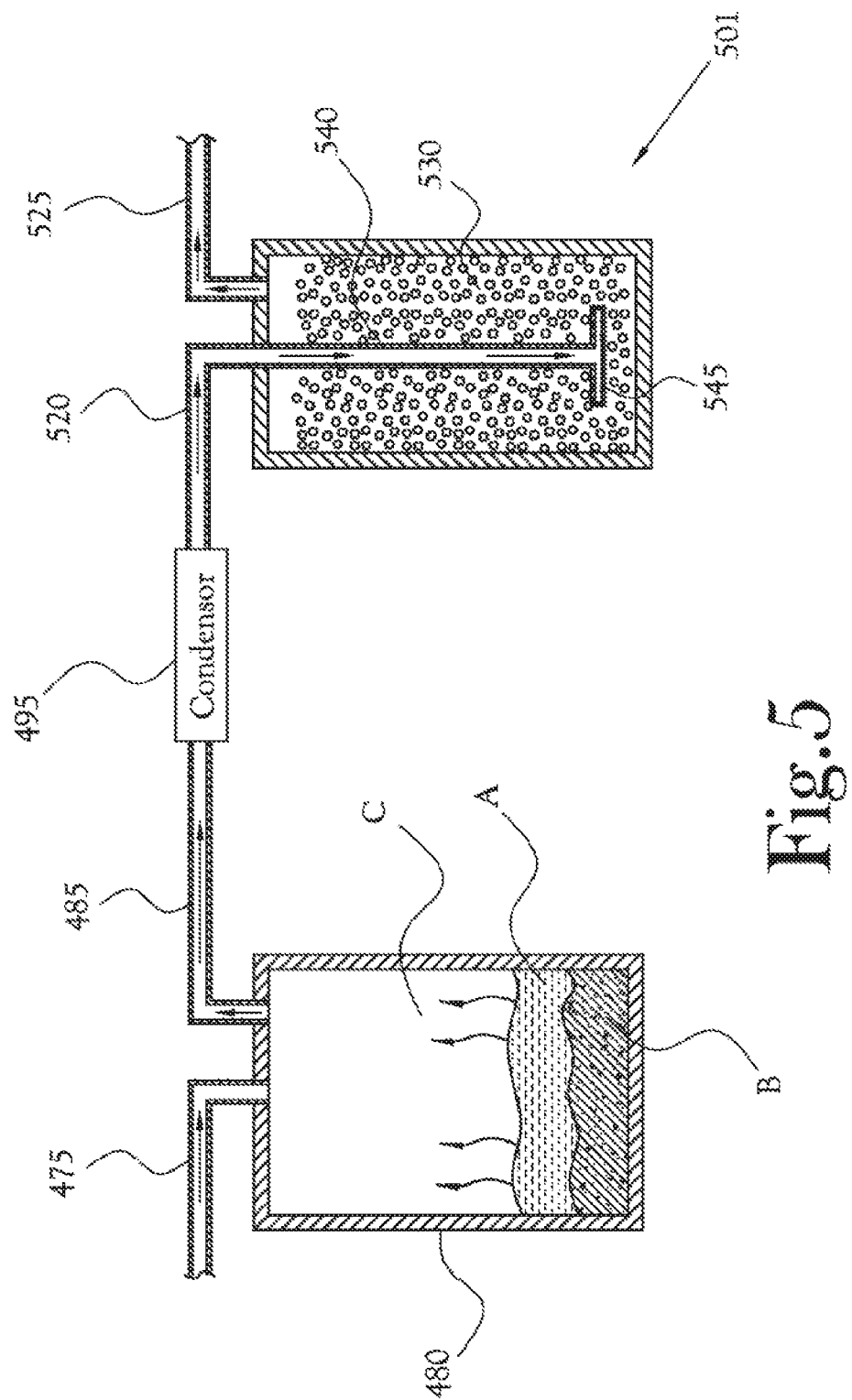
FIG. 5 is a view of one embodiment of the present invention, in which an ISM-column is used to separate radioactive isotopes from the off-gas of another radioactive waste treatment process.

FIG. 5 illustrates another embodiment of the present invention, in which an ISM column according to the present invention is employed to separate radioactive isotopes from the off-gas of another waste treatment system. In the illustrated embodiment, a melter 480 receives solid radioactive waste material or a slurry mixture of solid and liquid radioactive waste material ("incoming waste material") from an inlet line 475. (It will be understood that a wide variety of melters are compatible with this setup, including joule melters, microwave-based melters, inductive heating crucibles, and others.) This incoming waste material is heated in order to pyrolize the incoming waste material so that the waste material achieves a molten state A. The pyrolized and molten waste material is then cooled (or allowed to cool) into a dense, solidified, and often vitrified final solid waste product B. During the pyrolysis of the incoming waste material, during the period when the waste material A is in a molten state, and during the vitrification process, the waste material is expelling gases and vapors C that carry radioactive isotopes. These gases and vapors carrying radioactive isotopes exit the melter 480 through a melter outlet line 485 and enter a condenser 405, where gases and vapors carrying radioactive isotopes are converted to liquid carrying radioactive isotopes. The liquid carrying radioactive isotopes travels through a column inlet line 520 into an ISM column 501, where the liquid carrying radioactive isotopes passes through a dip tube 540, distribution ring 545, and ISM 530, where specific radioactive isotopes are separated and retained by the media. The liquid then exits the ISM column 501 through a column outlet line 525. In this embodiment an ISM column separates and isolates radioactive isotopes that are not retained and stabilized in the stabilization of the original incoming waste material.

FIG. 6 illustrates an alternative embodiment of an ISM column according to the present invention. In several previously illustrated embodiments (such as FIGS. 3C, 4, and 5), liquid waste material enters the column through a dip tube, proceeding to a point near the bottom of the column container before passing upwards through the ISM toward an outlet line near the top of the column container. In the embodiment shown in FIG. 6, liquid carrying radioactive isotopes enters the column 601 through an inlet line 620 at the top of the column container 610. Liquid with radioactive isotopes then trickles down through ISM 630 toward the bottom of the column container 610. Near the bottom of the column container 610, liquid is pushed or sucked up a dip tube 641 that connects loan outlet line 625 at the top of the column container 610. The illustrated embodiment further comprises a safety outlet 627, also located near the top of the column container 610.

The present invention is not limited to the illustrated embodiments. In some alternative embodiments, ISM are added to a liquid waste holding tank and stirred or otherwise mixed into the liquid; after the ISM have separated the specified radioactive isotopes from the liquid, the ISM with radioactive isotopes are removed from the liquid (for example, through centrifugation, filtration, or electrocoagulation). Those of skill in the art will recognize mat the present invention encompasses several other potential uses for ion-specific media in connection with separating and isolating radioactive isotopes from nuclear wastes.

In some embodiments of the invention, glass-based microspheres or similar materials are used as media in part because they facilitate the vitrification process. In one particular vitrification application, iron phosphate glass-forming materials are useful for vitrifying and stabilizing uranium and uranium oxides. In experimental tests, a mixture of glass-forming materials ("glass formers") comprised a blend that was approximately 20% by weight iron oxide, 52% by weight phosphorus pentoxide, and 23% sodium oxide. The iron phosphate glass formers were mixed with depleted uranium pellets in a uranium-to-glass ratio of approximately 1:9. Before mixing, the depleted uranium pellets were washed in nitric acid, rinsed, and vacuum-packed to prevent pre-oxidation. The mixed uranium and iron phosphate glass formers were heated in a graphite crucible for 500° C. for 30 minutes, then 700° C. for 30 minutes, then 900° C. for 30 minutes, and finally approximately 1063° C. for 30 minutes. At 500° C. and 700° C., the uranium oxidized, and at the higher temperatures, the uranium oxide and the iron phosphate glass formers underwent vitrification and formed a substantially uniform glass uranium product. Scanning electron microscopy and energy dispersive absorption of X-rays (EDAX) confirmed that the vitrification process had yielded a final waste product with non-metal, non-oxidized uranium isotopes evenly dissolved and distributed throughout the glass matrix.

While the present invention has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A process for treating radioactive isotopes in liquid, the method comprising:
    mixing glass beads comprising sodium, calcium and boron with a potassium phosphate solution, wherein the sodium, calcium, and boron react with the potassium phosphate solution to form a hydroxyapatite layer that covers the glass beads;
    placing hydroxyapatite microspheres comprising the glass beads covered with the hydroxyapatite layer in an ion exchange column;
    passing the liquid with radioactive isotopes through the ion exchange column of media comprising the hydroxyapatite microspheres for capturing one or more of the radioactive isotopes from the liquid, wherein passing the liquid with radioactive isotopes through the ion exchange column comprises passing said liquid through a dip tube oriented in a generally vertical direction and into a distribution ring attached to the dip tube and suspended within the ion exchange column in a generally horizontal orientation, and wherein the distribution ring comprises a plurality of distribution holes that direct the liquid radioactive waste in a downward direction towards a bottom end of the ion exchange column, whereby as the liquid passes through and near the media contained within the ion exchange column, the one or more radioactive isotopes are separated from the liquid and retained within the ion exchange column by the media; and
    heating the media and separated radioactive isotopes to form a vitrified waste product, wherein the vitrified waste product contains at least one of the the dip tube and the distribution ring.

2. The process of claim 1, wherein the one or more radioactive isotopes comprise strontium.

3. The process of claim 2, wherein the media include glass-based microspheres.

4. The process of claim 1, wherein the media include Herschelite.

5. The process of claim 1, wherein the media include a surfactant-modified zeolite.

6. The process of claim 1, wherein the liquid with radioactive isotopes is passed through multiple columns, each column containing media for capturing at least one radioactive isotope different from one or more radioactive isotopes separated in the other columns.

7. The process of claim 1, wherein the potassium phosphate solution also comprises potassium hydroxide.

8. A process for treating radioactive isotopes, the process comprising:
    pyrolizing solid radioactive waste;
    expelling gas and vapor that result from pyrolizing the solid radioactive waste, wherein the expelled gas and vapor comprise one or more radioactive isotopes;
    condensing the expelled gas and vapor to form liquid radioactive waste;
    mixing the liquid radioactive waste with a plurality of microspheres contained in an ion exchange column to transfer one or more radioactive isotopes from the liquid radioactive waste to the plurality of microspheres;
    responsive to mixing the liquid radioactive waste, pass the waste through a dip tube oriented in a generally vertical direction and into a distribution ring attached to the dip tube and suspended within the ion exchange column in a generally horizontal orientation, and wherein the distribution ring comprises a plurality of distribution holes that direct the liquid radioactive waste in a downward direction towards a bottom end of the ion exchange column;
    pumping the liquid waste out of the column; and
    heating the plurality of microspheres with the transferred radioactive isotopes while located inside of the column to form a vitrified waste product, wherein the vitrified waste product contains at least one of the dip tube and the distribution ring.

9. The process of claim 8, wherein the ion exchange column includes a graphite inner layer that acts as a susceptor for inductive heating of the plurality of microspheres.

10. The process of claim 8, wherein the plurality of microspheres comprise glass beads mixed with a potassium phosphate solution to form hydroxyapatite microspheres.

11. The process of claim 8, wherein pyrolizing the solid radioactive waste comprises forming molten radioactive material, and wherein the process further comprises vitrifying the molten radioactive material separately from the plurality of microspheres.

12. The process of claim 11, wherein the ion exchange column is configured to separate and isolate radioactive isotopes that are not vitrified with the molten radioactive material.

\* \* \* \* \*